(12) United States Patent
Mcardle

(10) Patent No.: US 10,338,243 B2
(45) Date of Patent: Jul. 2, 2019

(54) INTERPRETATION OF SEISMIC SURVEY DATA USING SYNTHETIC MODELLING

(71) Applicant: Foster Findlay Associates Limited, Tyne and Wear (GB)

(72) Inventor: Nicholas Mcardle, Aberdeenshire (GB)

(73) Assignee: Foster Findlay Associates Limited, Tyne and Wear (GB)

( * ) Notice: Subject to any disclaimer, the term of this patent is extended or adjusted under 35 U.S.C. 154(b) by 0 days.

(21) Appl. No.: 15/118,964

(22) PCT Filed: Mar. 19, 2015

(86) PCT No.: PCT/GB2015/050802
§ 371 (c)(1),
(2) Date: Aug. 15, 2016

(87) PCT Pub. No.: WO2015/150728
PCT Pub. Date: Oct. 8, 2015

(65) Prior Publication Data
US 2017/0052268 A1    Feb. 23, 2017

(30) Foreign Application Priority Data

Mar. 31, 2014    (GB) .................................. 1405779.8

(51) Int. Cl.
*G01V 1/28*    (2006.01)
*G01V 1/30*    (2006.01)
*G01V 1/38*    (2006.01)

(52) U.S. Cl.
CPC .............. *G01V 1/282* (2013.01); *G01V 1/302* (2013.01); *G01V 1/38* (2013.01); *G01V 1/308* (2013.01);
(Continued)

(58) Field of Classification Search
CPC .......... G01V 1/38; G01V 1/282; G01V 1/302; G01V 2210/43; G01V 2210/614
See application file for complete search history.

(56) References Cited

U.S. PATENT DOCUMENTS 4,821,164 A * 4/1989 Swanson ................. G01V 1/282
2/919
5,691,958 A * 11/1997 Calvert .................... G01V 1/28
367/25
(Continued)

FOREIGN PATENT DOCUMENTS

| GB | 2503507 | 1/2014 |
|---|---|---|
| WO | WO2011/005353 | 1/2011 |
| WO | WO2014/082018 | 5/2014 |

OTHER PUBLICATIONS

International Search Report and Written Opinion from International Application No. PCT/GB2015/050802, dated Jun. 30, 2015 (17 pages).
(Continued)

*Primary Examiner* — Alexander Satanovsky
*Assistant Examiner* — Lina M Cordero
(74) *Attorney, Agent, or Firm* — Workman Nydegger

(57) ABSTRACT

A method is provided for an improved interpretation of seismic data, comprising the steps of: •(a) obtaining a 3D seismic data set from a predetermined region; •(b) generating at least one attribute volume comprising at least one attribute of said 3D seismic data; •(c) selecting a zone of interest from said at least one attribute volume of said 3D seismic data set; •(d) determining a frequency spectrum of said zone of interest; •(e) generating a synthetic model of said zone of interest based on said frequency spectrum of said zone of interest and the model defined by at least a three dimensional space, wherein a first variable parameter is variable in a first dimension of the space, and at least a
(Continued)

second variable parameter is variable in at least a second and/or third dimension; •(f) calibrating said synthetic model utilizing additional data indicative to physical properties of said zone of interest; •(g) utilizing said calibrated synthetic model to provide the frequency spectrum of a synthetic seismic response of said zone of interest and project the spectrum on a horizon of said zone of interest, and •(h) generating a visual representation of said projected spectrum against said first variable parameter and at least said second variable parameter.

10 Claims, 9 Drawing Sheets

(52) U.S. Cl.
CPC .... *G01V 2210/43* (2013.01); *G01V 2210/614* (2013.01)

(56) References Cited

U.S. PATENT DOCUMENTS 6,594,585 B1 * 7/2003 Gersztenkorn .......... G01V 1/30
702/14

2014/0149042 A1 * 5/2014 Zhang .................... G01V 1/301
702/11

OTHER PUBLICATIONS

International Preliminary Report on Patentability from International Application No. PCT/GB2015/050802, dated Jun. 22, 2016 (17 pages).

N.J. McArdle et al: "Frequency Decomposition Methods Applied to Synthetic Models of the Hermod Submarine Fan System in the North Sea", 74th EAGLE Conference & Exhibition, Jun. 4-7, 2012 (6 pages).

N.J. McArdle et al: "Understanding Seismic Thin-bed Responses Using Frequency Decomposition and RGB Blending", =First Break, vol. 30, Dec. 2012 (10 pages).

Nocholas Cooke et al: "Forward Modelling to Understand Colour Responses in an HDFD RGB Blend Around a Gas Discovery", First Break, vol. 32, Mar. 2014 (8 pages).

Zijian Zhang et al: "Rock Physics-based Seismic Trace Analysis of Unconsolidated Sediments Containing Gas Hydrate and Free Gas in Green Canyon 955, Northern Gulf of Mexico", Elsevier Marine and Petroleum Geology, vol. 34, 2012 (16 pages).

* cited by examiner (a)

(b)

INTERPRETATION OF SEISMIC SURVEY DATA USING SYNTHETIC MODELLING

The present invention relates generally to the field of oil and gas exploration, and towards a method of processing seismic data so as to provide improved quantification, classification and visualisation of geologic features and the petrophysical properties of the stratigraphic layers in a zone of interest in an exploration region. In particular, the present invention relates to improved synthetic modelling of a zone of interest in an exploration region.

INTRODUCTION

In the oil and gas industry, geological data surveys such as, for example, seismic prospecting and other similar techniques are commonly used to aid in the search for and evaluation of subterranean hydrocarbon deposits. As an example, prospecting operations include three basic stages (i) data acquisition, (ii) data processing and (iii) data interpretation. The success of the prospecting operation generally depends on satisfactory completion of (i), (ii) and (iii). For example, a seismic source is used to generate an acoustic signal that propagates into the earth and that is at least partially reflected by subsurface seismic reflectors. The reflected signals are then detected and recorded by an array of seismic receivers located at or near the surface of the earth, in an overlying body of water, or at known depths of boreholes.

FIG. 1, for example, shows a typical setup for offshore seismic surveys, where a large seismic survey vessel 10 is used to tow acoustic receivers 12, also known as streamers, suspended below the surface, which carry hydrophones (not shown). During data acquisition, sound waves 14 are transmitted from the vessel 10 using compressed air guns 16 and which travel down through the seabed and reflect back from the different layers (strata) of rock 18, 20, 22. The reflected sound waves 14 are then received by the hydrophones (not shown) located along the seismic streamers which, when processed, can be used to provide a visual representation (2D, 3D) of the substrata.

Typical seismic traces of the reflections (amplitudes) are shown in FIG. 2. The data shown in FIG. 2 has been migrated, i.e. the amplitudes of the traces are moved to their true subsurface position (depth) to eliminate any offset between the source and receiver. This example of a 2D seismic survey can be thought of as providing a cross sectional picture of the earth layers as they exist directly beneath the recording locations.

The seismic traces are digital recordings of the sound energy reflected back from the inhomogeneities of the subsurface, an at least partial reflection occurring every time there is a change in acoustic impedance (i.e. density, wave velocity) of the subsurface material. Each trace is also associated with a "travel time" and the surface position of each trace in a seismic survey is carefully recorded, allowing the seismic information contained within the traces to be later correlated with specific subsurface locations. Also, the signal sent down into the earth is a specific seismic waveform, also known as wavelet. At each interface between two different rock formations, there is a potential for a seismic reflection to occur, wherein the reflected seismic energy is dependent upon the difference in acoustic impedance.

The reflected energy that is then recorded at the surface can be represented conceptually as the convolution of the seismic wavelet with a subsurface reflectivity function (i.e. convolution model), which represents the difference in acoustic impedance.

Various models have then been created to test simple geological scenarios. For example, variation in rock properties is accommodated by modifying acoustic impedance within these models. Spectral interference caused by, for example, changes in bed thickness can be predicted using so called "wedge models" that approximate the seismic response at the boundaries of each model.

The use of "wedge models" and its "tuning" to a zone of interest is well understood in the field (see Widess, 1973; Kallweit & Wood, 1982, Partyka et al., 1999) and not explained in any further detail.

In addition, frequency decomposition colour blending has now become commonplace in the analysis of stratigraphic formations from 3D seismic data, because red-green-blue (RGB) colour blending is a particular effective way to display multiple frequency decomposition responses. In particular, the interference between different frequency bands can reveal superior detail within the colour blend highlighting very subtle and sub-seismic resolution.

However, despite extensive research and use of synthetic modeling to predict the effect of different geometries (e.g. thickness) on reconstructed responses, as well as, the advances made in the visual representation of subsurface "geometries", the available models may still result in false or at least inaccurate interpretation when ignoring the potential effect of varying petrophysical properties on the spectral interference patterns.

Accordingly, it is an object of the present invention to provide a method and system that is adapted to improve the interpretability of seismic data.

SUMMARY OF THE INVENTION

Preferred embodiment(s) of the invention seek to overcome one or more of the above disadvantages of the prior art.

According to a first embodiment of the invention there is provided a method for the improved interpretation of seismic data, comprising the steps of:
(a) obtaining a 3D seismic data set from a predetermined region;
(b) generating at least one attribute volume comprising at least one attribute of said 3D seismic data;
(c) selecting a zone of interest from said at least one attribute volume of said 3D seismic data set;
(d) determining a frequency spectrum of said zone of interest;
(e) generating a synthetic model based on said frequency spectrum of said zone of interest and defining at least a three dimensional space, wherein a first variable parameter is defined in a first dimension, and at least a second variable parameter is defined in at least a second and/or third dimension;
(f) calibrating said synthetic model utilising additional data indicative to physical properties of said zone of interest;
(g) utilising said calibrated synthetic model with said zone of interest so as to provide a projected response of said zone of interest, and
(h) generating a visual representation of said projected response against said first variable parameter and at least said second variable parameter.

Preferably, said synthetic model may be a 3D wedge model and said at least one first variable parameter may be a thickness of said zone of interest. Advantageously, said at least one second variable parameter may be a physical property of said zone of interest. Even more advantageously, said physical property may be any one of an initial water/hydrocarbon saturation, porosity and acoustic impedance. Preferably, said first variable parameter and at least said second variable parameter may be unrelated variable parameter.

This provides the advantage of providing improved accuracy of interpretation of seismic data. In particular, calibrating a synthetic model that is generated to predict the thickness of geologic features in a zone of interest with additional, for example, petrophysical data (e.g. water/hydrocarbon saturation, acoustic impedance etc.), significantly improves the information value of a visual representation (i.e. an RGB blend) of seismic data of a zone of interest. Thus, more accurate predictions can be made of the subterranean layers, saving considerable time and expenses when searching for hydrocarbon deposits. In addition, when utilising the calibrated synthetic model to generate an RGB cross-plot of the zone of interest, geologic feature thickness, as well as, fluid effects defined by, for example, rock physical parameters, can be investigated simultaneously.

Preferably, said synthetic model may be frequency-matched to said zone of interest. Advantageously, step (g) may include a spectral decomposition of said calibrated synthetic model into magnitude responses of a plurality of predetermined frequencies. Preferably, said spectral decomposition may be a band-pass decomposition utilizing Gabor wavelet convolution. Even more preferably, said spectral decomposition may be any one of a constant-bandwidth decomposition, a constant-Q decomposition and a High-Definition-Frequency decomposition.

Additionally, step (g) may further includes attributing each of said plurality of predetermined frequencies to a predetermined colour space and generating a colour blend of said plurality of predetermined frequencies. Preferably, said predetermined colour space may include any one of a red colour scale, a green colour scale and a blue colour scale.

Advantageously, said additional data may be obtained from any one of a well-log recorded in a region of said zone of interest, a well-log recorded in region away from but stratigraphically comparable to said zone of interest, and data extrapolated from known properties of geologic features.

Preferably, step (h) may include generating a colour blend cross-plot of said first variable parameter against at least said second variable parameter. This provides the advantage that variable parameters that are unrelated to each other, can be investigated simultaneously, so as to provide further detailed information of the composition of the zone of interest.

Alternatively, said synthetic model may include a third variable parameter defined in a fourth dimension. Preferably, said third variable may be a time-variant of said projected response of said zone of interest. This provides the advantage that temporal changes of the spectral interference pattern generated by, for example, two independent variable parameters for a predetermined zone of interest, can be illustrated over a predetermined time period, therefore, further improving the accuracy of interpretation.

According to a second embodiment of the invention there is provided a computer system for improving the interpretation of seismic data by a method according to the first embodiment.

According to a third embodiment of the invention there is provided a computer readable storage medium having embodied thereon a computer program, when executed by a computer processor that may be configured to perform the method of the first embodiment.

BRIEF DESCRIPTION OF THE DRAWINGS

Preferred embodiments of the present invention will now be described, by way of example only and not in any limitative sense, with reference to the accompanying drawings, in which.

DETAILED DESCRIPTION OF THE PREFERRED EMBODIMENT(S)

The exemplary embodiments of this invention will be described in relation to interpretation of 3D seismic data. However, it should be appreciated that, in general, the system and method of this invention will work equally well for any other type of 3D data from any environment.

Figure 12:
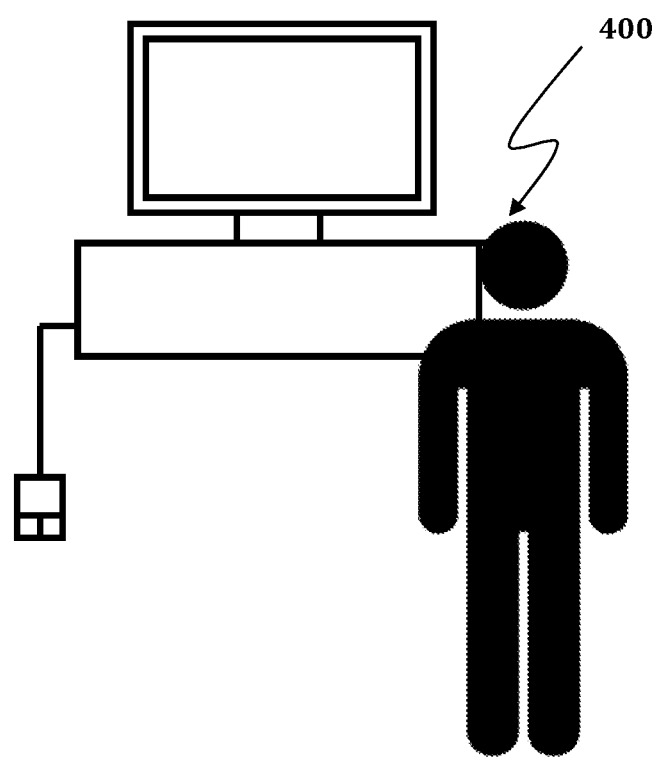
FIG. 12 shows a simplified illustration of a computer system adapted to execute the method of the invention.

For purposes of explanation, it should be appreciated that the terms 'determine', 'calculate' and 'compute', and variations thereof, as used herein are used interchangeably and include any type of methodology, process, mathematical operation or technique, including those performed by a system 400, as depicted in a simplified form in FIG. 12. The terms 'generating' and 'adapting' are also used interchangeably describing any type of computer modelling technique for visual representation of a subterranean environment from geological survey data, such as 3D seismic data. In addition, the terms 'vertical' and 'horizontal' refer to the angular orientation with respect to the surface of the earth, i.e. a seismic data volume is orientated such that 'vertical' means substantially perpendicular to the general orientation of the ground surface of the earth (assuming the surface is substantially flat), and 'horizontal' means substantially parallel to the general orientation of the ground surface of the earth. In other words, a seismic data volume is therefore in alignment with respect to the surface of the earth so that the top of the seismic volume is towards the surface of the earth and the bottom of the seismic volume is towards the centre of the earth.

Furthermore, synthetic modelling and the 'wedge model' in particular, as well as, RGB blending techniques are commonly known by the person skilled in the art, and generally refer to modelling techniques as disclosed, for example, in U.S. Pat. No. 5,870,691 and "Understanding seismic thin-bed responses using frequency decomposition and RGB blending", first break volume 30, December 2012, N. J. McArdle et. al.

Figure 1:
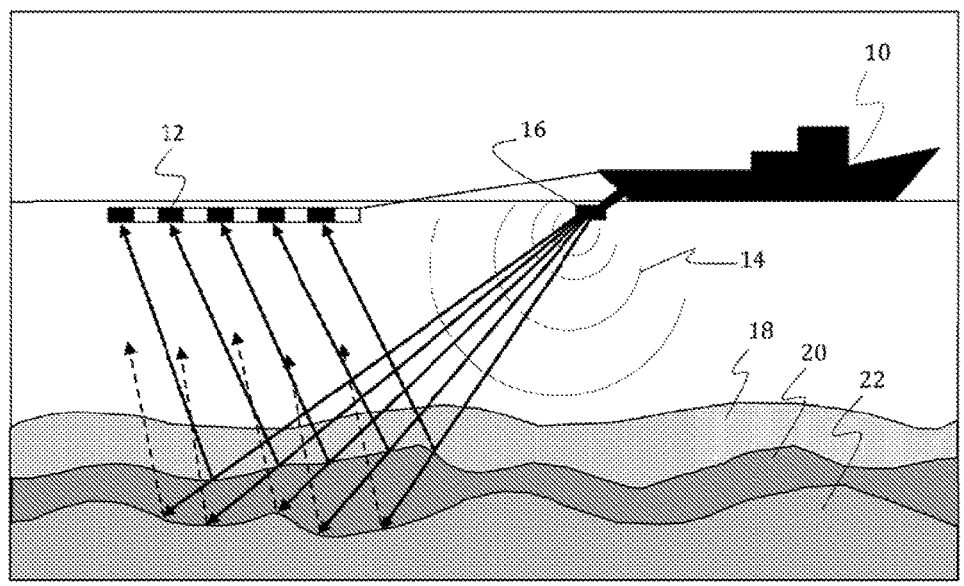
FIG. 1 shows a typical setup for an offshore seismic survey using an array of acoustic receivers (i.e. hydrophones) and sound waves generated by an air gun.
Figure 2:
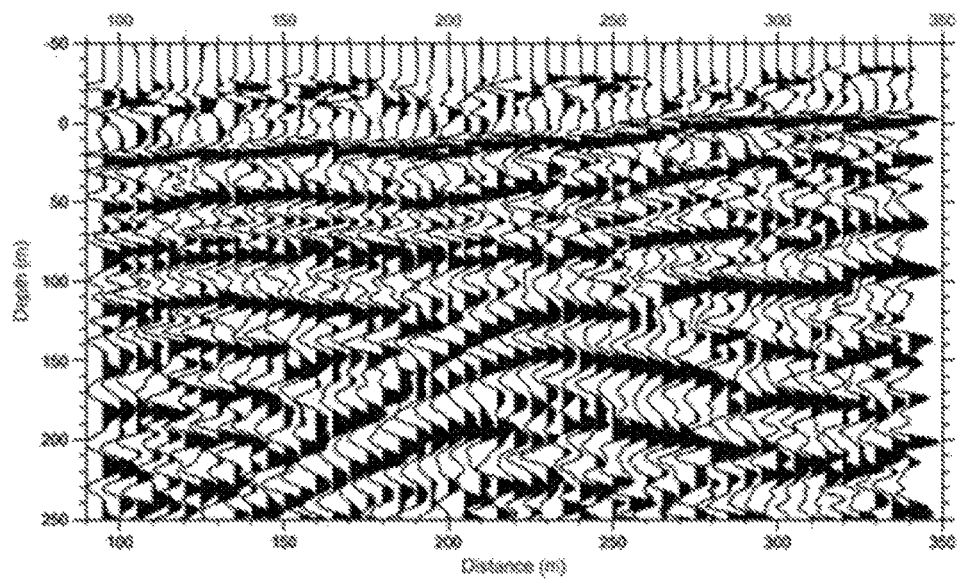
FIG. 2 shows a typical plot of migrated reflection traces recorded by the acoustic receivers after activating the air gun.
Figure 3:
FIG. 3 shows an example of a frequency decomposition RGB blend (greyscale)

When analysing seismic 3D data, it is now common practice to utilise frequency decomposition RGB blends that can be generated using a variety of methods, where the decomposition bands vary in a central frequency and bandwidth. As illustrated in FIG. 3, the RGB colour blend is a co-visualisation of three volumetric magnitude responses computed using different decomposition frequencies.

The different methods of frequency decomposition may be (i) constant bandwidth decomposition, (ii) constant Q decomposition and (iii) high definition frequency decomposition (HDFD), however, any other suitable frequency decomposition method may be used.

Constant bandwidth decomposition is a band-pass method where the decomposition bands have the same bandwidth at different central frequencies, which is achieved by varying the wavelet scale. Constant Q decomposition is a band-pass method where the decomposition bands have an increasing bandwidth with increasing central frequencies, which is achieved by keeping the wavelet scale constant for different central frequencies. HDFD is a variant of matching pursuit decomposition, where wavelets (from a predetermined dictionary) are fitted to the seismic trace. Once the wavelet decomposition has been computed, a magnitude response can be reconstructed at any given frequency using the appropriate wavelets.

As commonly known, wedge models are particularly useful for determining the expected seismic response where there is a variation in thickness, and when applied to a geologic situation, wedge models provide an analogue for where a stratigraphic layer thins or pinches out.

Thus, the wedge model frequency response provides an informative way of examining the advantages of sensitivities of the different decomposition methods, and when the decomposition and source frequencies (wavelet) are carefully matched to those used in the real subsurface example (i.e. zone of interest), it can provide a method of calibrating the colour response, for example, to thickness.

However, the spectra magnitude responses vary not only to stratigraphic thickness variation, but also to petrophysical variation (e.g. lithology and fluid saturation). A Gassmann fluid substitution may be used to provide a realistic representation of fluid variation. Utilizing Gassmann equations when modelling the fluid variation may also allow the investigation of variation in the bulk rock properties.

In particular, a realistic Gassmann substitution can be ultimately used to derive variations in reflection strength with fluid properties, given a number of initial petrophysical measurements (well logs). These measurements should be known for the rock matrix (and hydrocarbon and brine saturation, where applicable), and may include P-wave velocity, S-wave velocity, density, porosity and initial water/hydrocarbon saturation.

Figure 4:
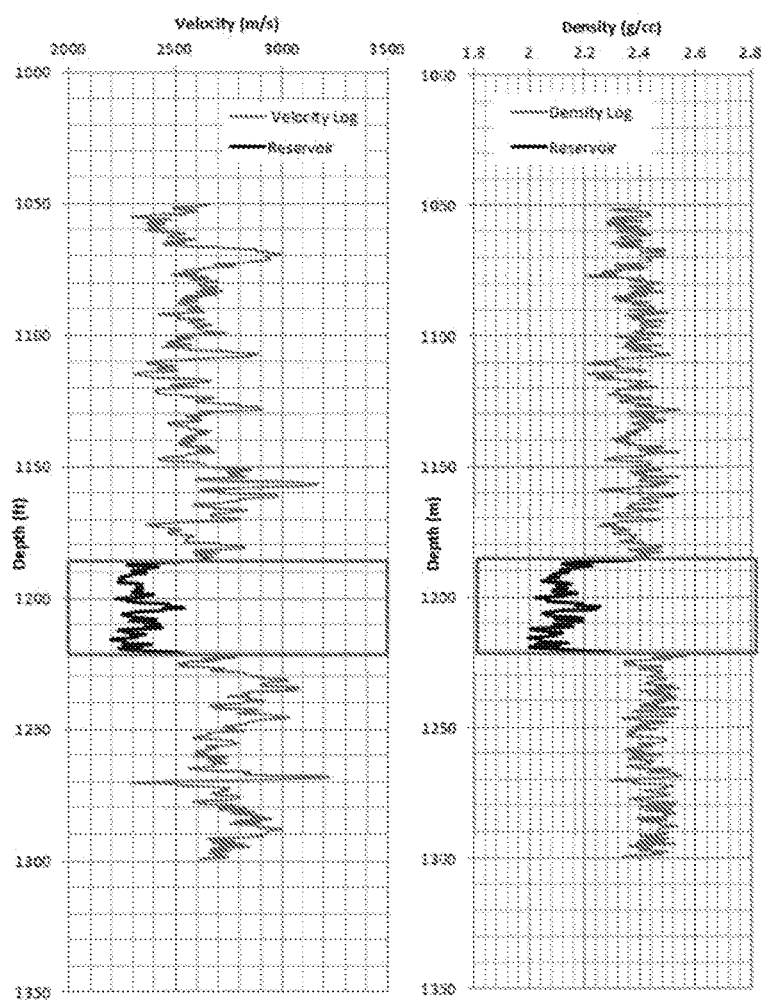
FIG. 4 shows an example of a typical well log measuring velocity (m/s) and density (g/cc) of the subterranean layers in a zone of interest.
Figure 5:
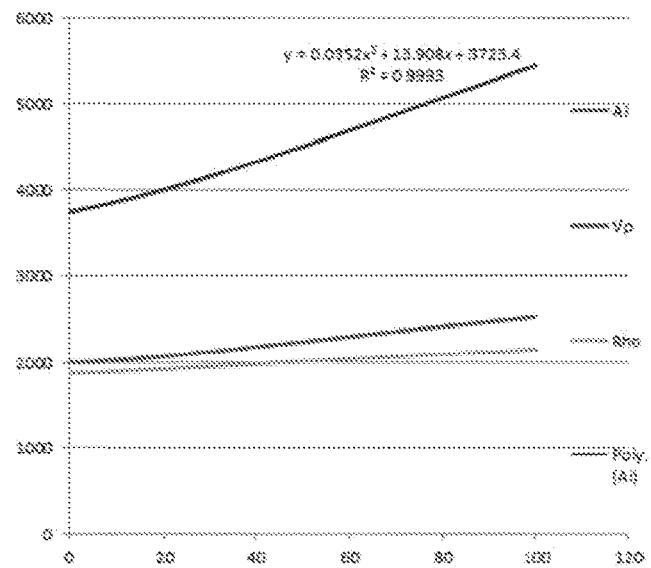
FIG. 5 illustrates the variation of acoustic properties determined from the well log shown in FIG. 4.

FIG. 4 shows an example of typical well log data at a reservoir interval including velocity and density, wherein the variation in acoustic properties is shown in FIG. 5.

In addition to performing actual measurements in a well at the zone of interest, the required parameters may also be estimated based on typical properties, or extrapolated from information provided for similar geologic subsurface features.

Figure 6:
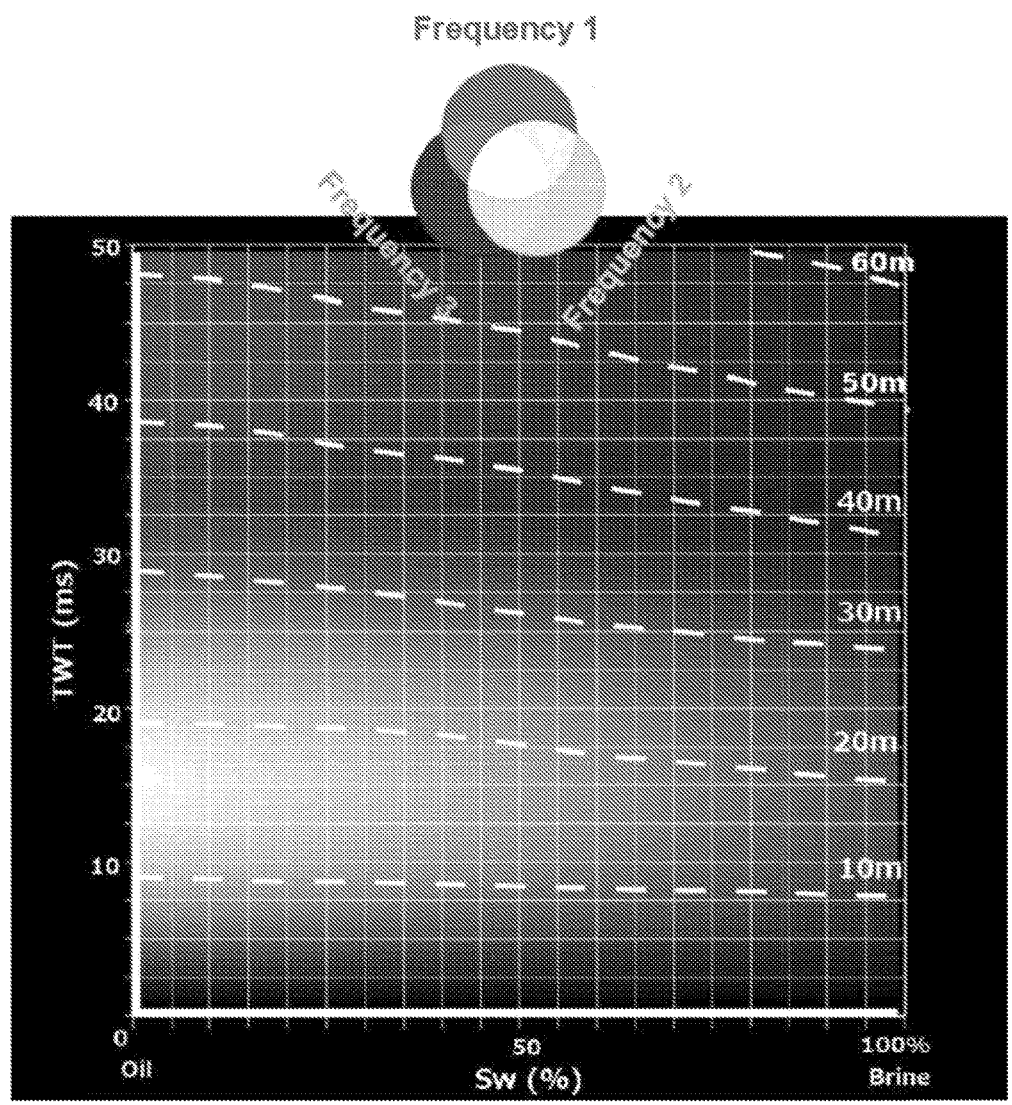
FIG. 6 shows a greyscale illustration of an RGB cross plot of layer thickness (TWT) and hydrocarbon/water saturation (%)
Figure 7:
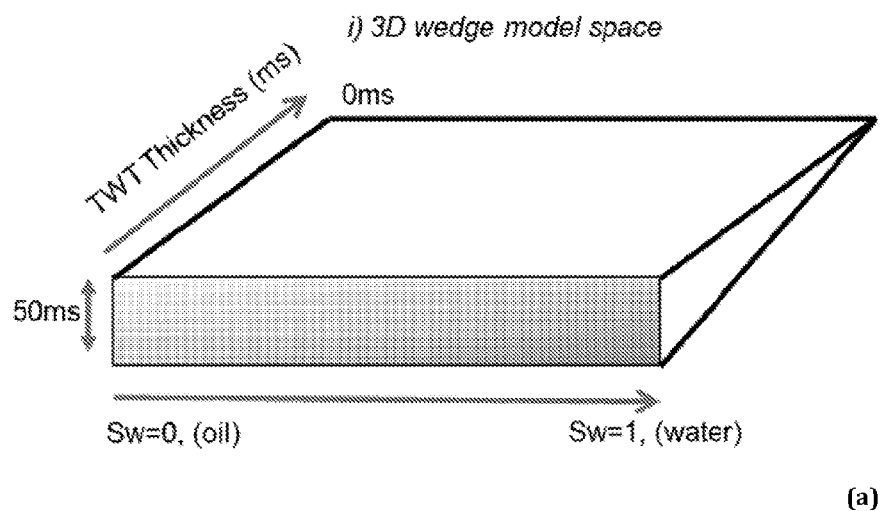
FIG. 7 shows a simplified illustration of (a) a 3D wedge model space and (b) the synthetic seismic at the frequency of the seismic data from the zone of interest.
Figure 7:
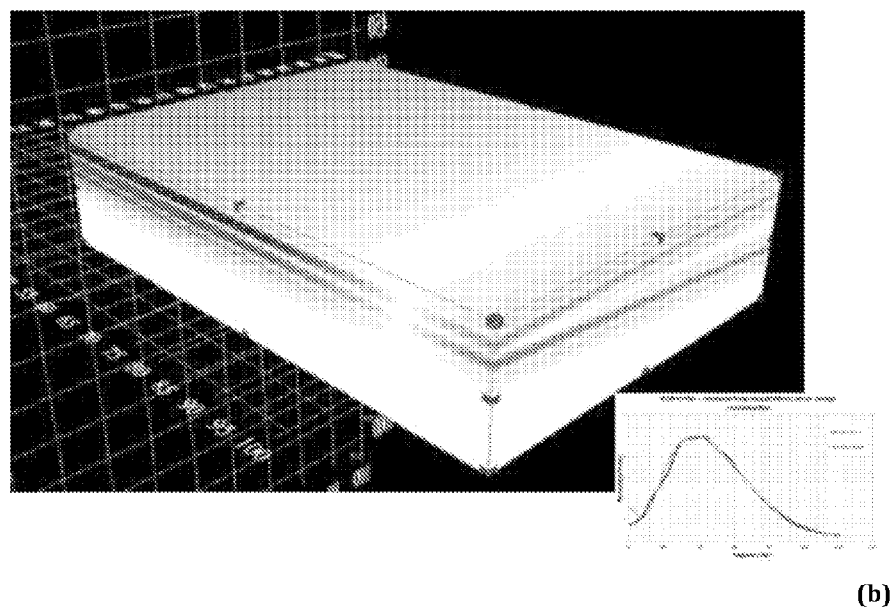

FIG. 6 is a greyscale illustration of a typical RGB cross plot, where the colour blend represented by simplified hatching and annotations. In a real RGB cross plot the transitions between different colour space is smooth. The RGB cross plot shown in FIG. 6 allows investigation of a set of frequency decomposition parameters applied to a simple thickness versus petrophysics model space (e.g. fluid saturation of Oil and Brine). The frequency decomposition parameters (i.e. central frequencies and bandwidths of the magnitude responses and relative scaling) are taken from the existing blend to be investigated. Here, the thickness versus petrophysics space is a 3D wedge model. As shown in FIGS. 7 (a) and (b), a synthetic seismic response is generated over this model space at the frequency of the "real" seismic data of the zone of interest, wherein the synthetic model utilizes the Gassmann substitution.

Figure 8:
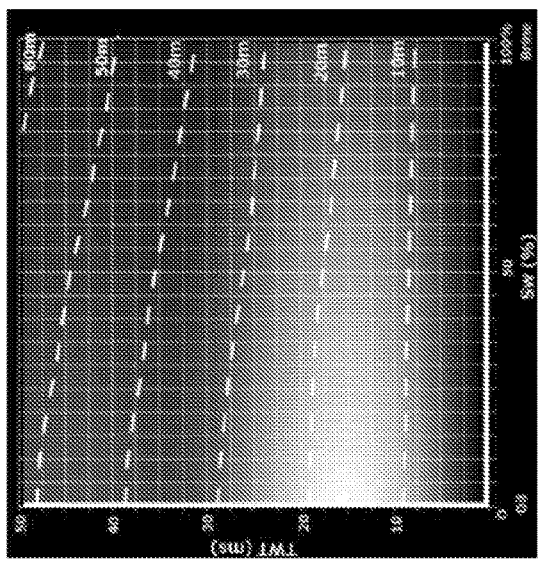
FIG. 8 (a) shows an example of the RGB cross plot positioned in a 3D environment of the zone of interest.
Figure 8:
Figure 8:
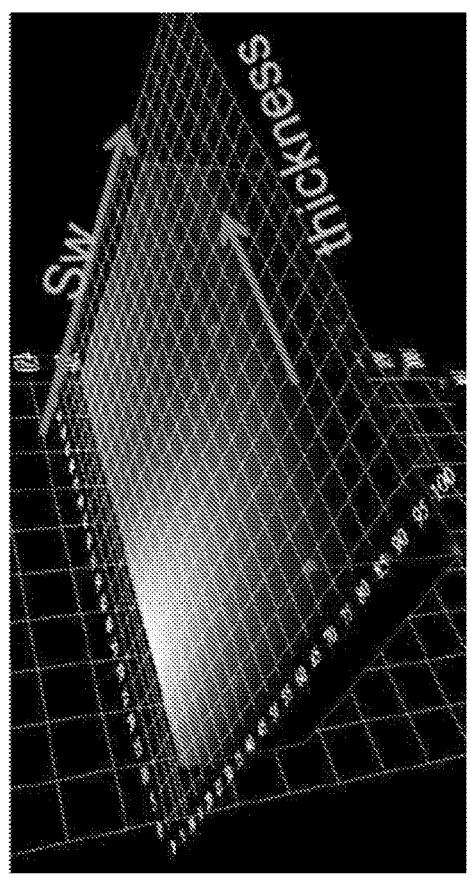

Frequency decomposition using the same parameters and scaling as for the original blend is then applied to the synthetic model. As illustrated in FIG. 8, the resulting RGB cross plot is the central horizon projection of the Frequency decomposition RGB Blend on the 3D wedge model, showing the spectral interference patterns generated by varying thickness and fluid properties as an RGB response.

Figure 9:
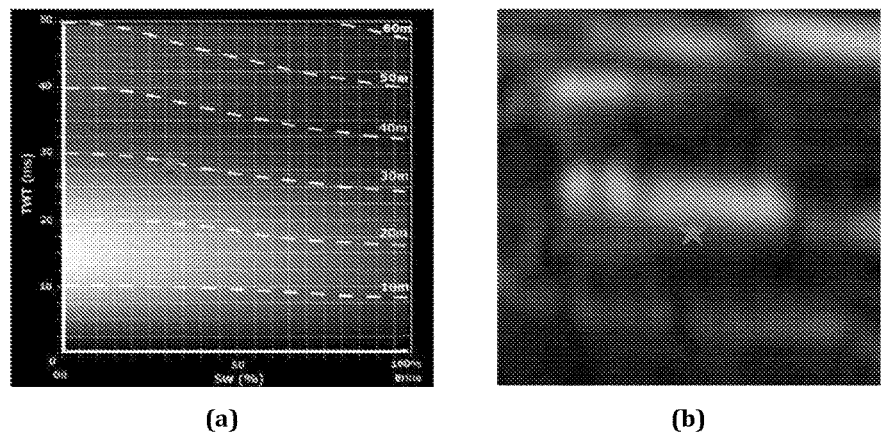
FIG. 9 illustrates the correlation (star) of the information provided (a) in the RGB cross plot and (b) the seismic data of the zone of interest.

FIG. 9 shows a correlation between the generated cross plot and the real data, wherein the cursor (star) links the RGB blend (colour of a geologic feature) in the "real data" with the interpretation provided by the cross plot.

Figure 10:
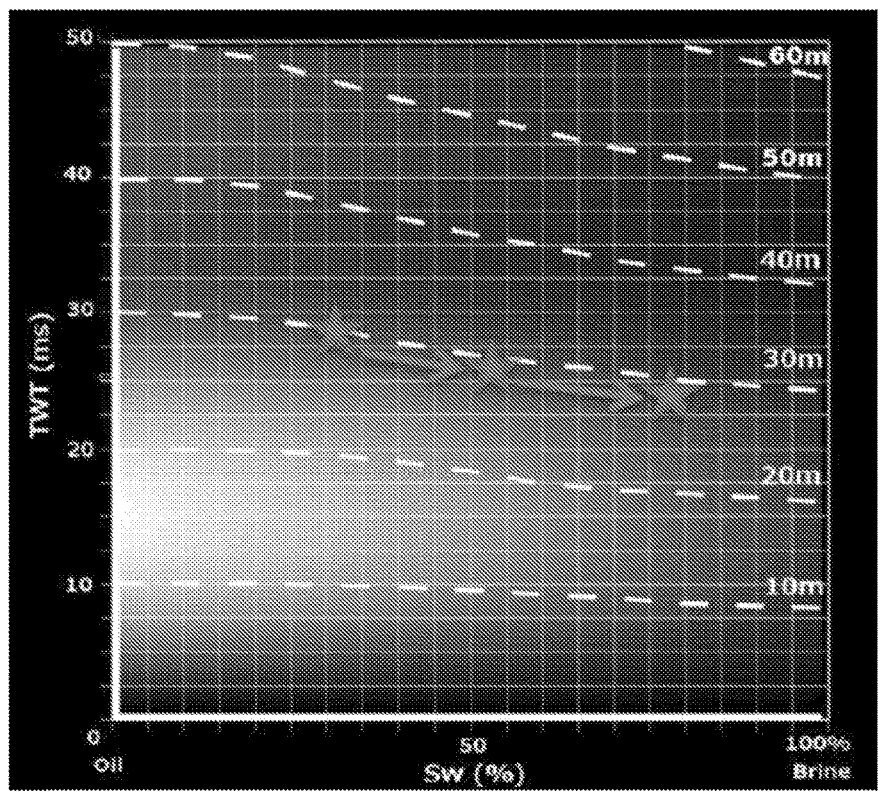
FIG. 10 shows an example of potential temporal changes of the spectral interference patterns modelled for the zone of interest (i.e. 4D effect)

FIG. 10 shows an alternative embodiment of the present invention, where a fourth dimension is added to the 3D wedge model space and illustrated on the RGB cross plot (moving curser). In particular, the 4D RGB cross plot allows visualisation of the change of spectral interference response in a predetermined time period, providing an even more accurate interpretation of the real data within a specific time period, and even allowing predictions of expected spectral interference responses in the future.

Figure 11:
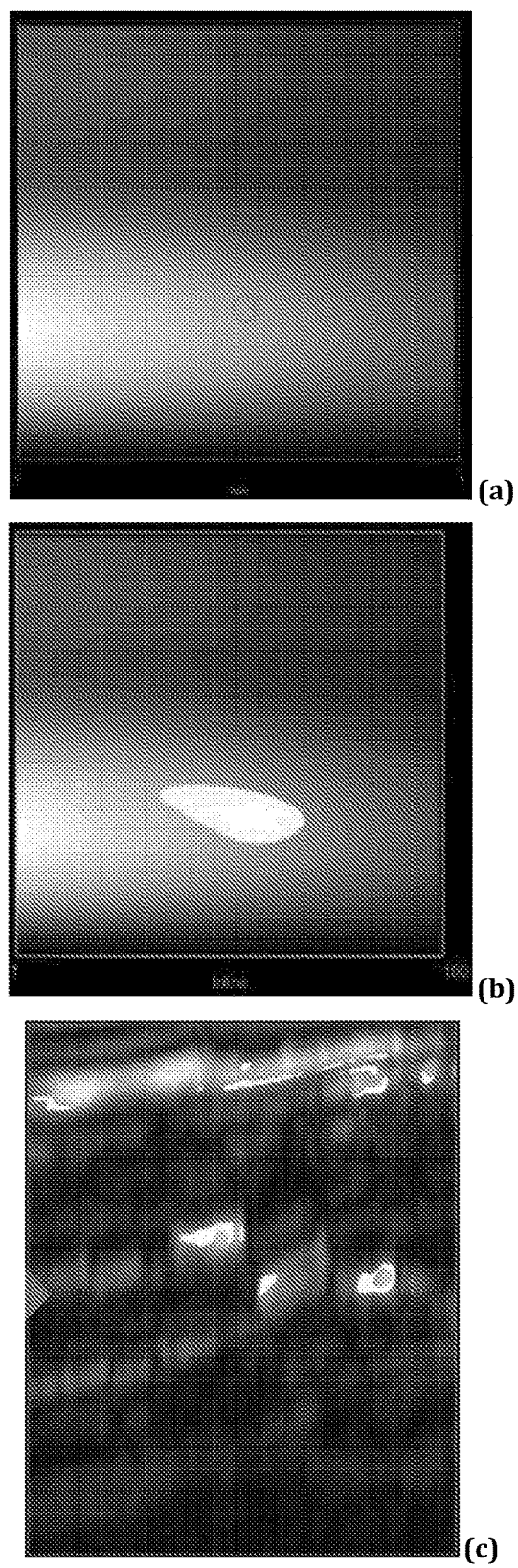
FIG. 11 shows screenshots of a workflow example of a classification based on a corresponding RGB cross plot, (a) determining classification zone around the well location, (b) 3D PDF on a marker zone, and (c) matching the classification determined in (a) and (b) on real seismic data of the zone of interest.

FIG. 11 is screenshots of a workflow example of a classification based on an RGB cross plot showing (a) the RGB cross plot classification zone around the well location, (b) a 3D PDF on the marker zone and (c) a matching classification on the real data.

When implementing the invention in a computer system 400 (FIG. 12) and interactive software application, an exemplary typical workflow for generating the RGB cross plot is as follows:

I. a zone of interest is selected in a 3D seismic data of a reservoir interval and at a well location;
II. a frequency spectrum is determined for the zone of interest using, for example, a Fast Fourier Transform;
III. acoustic properties are measured at the well location (e.g. well log data including velocity, density etc.) and the acoustic impedance of individual geologic layers is determined;
IV. the fluid substitution at the reservoir is calculated using Gassmann substitution (i.e. fully water to fully oil);

V. a 3D wedge model that is matched in frequency to the seismic data is created for a layer thickness and calibrated to the reservoir;

VI. a suitable frequency decomposition is applied to the calibrated 3D wedge model;

VII. an RGB colour blend is created from the magnitude volumes derived from the frequency decomposition;

VIII. an RGB cross plot is created from the centre slice of the RGB colour blend for interpretation of the real seismic data.

It will be appreciated by persons skilled in the art that the above embodiment has been described by way of example only and not in any limitative sense, and that various alterations and modifications are possible without departing from the scope of the invention as defined by the appended claims.

The invention claimed is:

1. A computer implemented method for generating an enhanced visual representation of a zone of interest from 3D seismic data to improve seismic data and mapping accuracy of subterranean layers of the zone of interest, where effects of varying petrophysical properties, including stratigraphic thickness and water/hydrocarbon saturation, on spectral interference patterns would otherwise result in an inaccurate mapping, the method comprising the steps of:
   (a) obtaining the 3D seismic data set from a predetermined region;
   (b) selecting the zone of interest from said 3D seismic data set;
   (c) determining a frequency spectrum of said zone of interest;
   (d) performing a spectral decomposition into magnitude responses of a plurality of predetermined frequencies for said frequency spectrum;
   (e) generating a synthetic model representative of said zone of interest defined in a four dimensional space, wherein a first variable parameter is defined in a first dimension of said four dimensional space, and a second variable parameter is defined in at least one of a second and third dimension of said four dimensional space, wherein the first variable parameter is stratigraphic thickness and the second variable parameter is water/hydrocarbon saturation, and wherein a third variable parameter is defined in a fourth dimension of said four dimensional space, the third variable being adapted to provide a change of said magnitude responses of said zone of interest within a predetermined time period;
   (f) performing seismic modelling for said synthetic model on a frequency band that matches that of the 3D seismic data set, generating a synthetic seismic data set representing a seismic response of said synthetic model;
   (g) determining a frequency spectrum of said synthetic seismic data set and performing spectral decomposition of said frequency spectrum into magnitude responses of a plurality of predetermined frequencies;
   (h) calibrating said synthetic model using petrophysical measurements indicative of the petrophysical properties of said zone of interest, the calibrating including correlating seismic reflection strength to the water/hydrocarbon saturation of the zone of interest given the petrophysical measurements;
   (i) projecting said frequency spectrum of said synthetic seismic data set onto a horizon or slice of said synthetic model;
   (j) generating a parameter cross plot of the magnitude responses of said projected frequency spectrum with respect to values of said first variable parameter and said second variable parameter that corresponds to the projection onto the horizon or slice;
   (k) identifying correlations between points of the cross plot and magnitude response values of the spectral decomposition of said zone of interest of said 3D seismic data set;
   (l) assigning, based on said identified correlations, values of said first and said second variable parameter to said zone of interest of said 3D seismic data set; and
   (m) generating the enhanced visual representation of the zone of interest of the 3D seismic data set according to the identified correlations, the enhanced visual representation providing improved accuracy of the 3D seismic data set with respect to the stratigraphic thickness and the water/hydrocarbon saturation.

2. The method according to claim 1, wherein said synthetic model is a 3D wedge model.

3. The method according to claim 1, wherein said spectral decomposition is a band-pass decomposition utilizing Gabor wavelet convolution.

4. The method according to claim 1, wherein said spectral decomposition is any one of a constant-bandwidth decomposition, a constant-Q decomposition and a High-Definition-Frequency decomposition.

5. The method according to claim 1, wherein step (g) further includes attributing each of said plurality of frequencies to a predetermined color space and generating a color blend from magnitude volumes derived from said spectral decomposition.

6. The method according to claim 5, wherein said predetermined color space includes any one of a red color scale, a green color scale and a blue color scale.

7. The method according to claim 1, wherein the petrophysical measurements are obtained from any one of a well-log recorded in a region of said zone of interest, a well-log recorded in a region away from but stratigraphically comparable to said zone of interest, and data extrapolated from known stratigraphic properties.

8. A computer system configured for improving an interpretation of seismic data by the method according to claim 1.

9. A computer program product comprising one or more hardware storage devices having stored thereon a computer program that, when said computer program is executed by a computer processor, is configured to perform the method of claim 1.

10. The method according to claim 1, wherein the third variable is visually represented on the cross plot, along with the first and second variables, to illustrate change of spectral interference response over the predetermined time period.

* * * * *